United States Patent Office 3,257,428
Patented June 21, 1966

3,257,428
1,17-DIOXYGENATED 5α-ANDROSTANES AND Δ² ANALOGS
Paul D. Klimstra, Northbrook, Ill., assignor to G. D. Searle & Co., Chicago, Ill., a corporation of Delaware
No Drawing. Filed July 10, 1962, Ser. No. 208,954
9 Claims. (Cl. 260—397.4)

This invention relates to 1,17-dioxygenated 5α-androstanes and Δ² steroids otherwise identical, and also to processes for the preparation thereof. More particularly, this invention provides new and useful chemical compounds of the formula

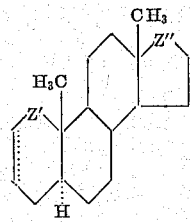

wherein Z' and Z" each represents an optionally-esterified hydroxymethylene radical or a carbonyl radical and the dotted line in ring A denotes optional Δ² unsaturation; alternatively, Z" represents a grouping of the formula

in which R represents an optionally-esterified hydroxyl.

Configuration of the optionally-esterified hydroxyls called for by the foregoing formulas is preferably 1α and 17β; and the 17-alkyl group depicted is most desirably of lower order, which is to say, methyl, ethyl, propyl, isopropyl, butyl, isobutyl, sec-butyl, tert-butyl, pentyl, neopentyl, hexyl, isohexyl, heptyl, octyl, and like —$C_nH_{2n+1}$ groupings wherein $n$ represents a positive integer less than 9. Among the esterifying moieties contemplated by Z', Z", and R, residues of alkanoic acids are preferred, especially lower alkanoyl radicals, i.e., groupings of the formula lower alkyl—CO— lower alkyl being defined as above.

The compounds to which this invention relates are useful because of their valuable pharmacological properties. Thus, for example, the compounds are anabolic, androgenic, progestational, and adapted to inhibit the effects of estrogen on the uterus; moreover, being antibacterial, they retard or prevent the growth of *Diplococcus pneumoniae*.

The 17α-(lower alkyl)-5α-androst-2-ene-1α,17β-diols hereof are prepared by heating the corresponding 1α,2α-epoxy-17β-hydroxy-17α-(lower alkyl)-5α-androstan-3-ones with hydrazine hydrate, and are monoesterified at carbon atom No. 1 by contacting with pyridine and alkanoic acid anhydride at room temperatures for upwards of 12 hours. Diesterification results if contact is at reflux rather than room temperatures for several hours. From the diesters thus obtained, on warming briefly with aqueous methanolic sodium carbonate, the 17-monoesters result. Oxidation of the 17α-(lower alkyl)-5α-androst-2-ene-1α,17β-diols with Jones reagent (a standardized preparation of $CrO_3$ described at J. Chem. Soc., 1946, 39) in acetonic medium affords the corresponding 1-ones, whereas hydrogenation catalyzed by ruthenium dioxide yields the corresponding 2,3-dihydro derivatives. The latter compounds are selectively esterified by the same techniques which apply to their Δ² progenitors, and likewise afford the corresponding 1-ones on acetonic chromic acid oxidation.

From 17β-acetoxy-1α,2α-epoxy-5α-androstan-3-one, on heating with hydrazine hydrate, is obtained 5α-androst-2-ene-1α,17β-diol which, after approximately 2 hours at room temperatures in the presence of pyridine and alkanoic acid anhydride, affords the corresponding 17-alkanoate ester. The corresponding diester instead of the monoester preponderates if contact is prolonged to 12 or more hours. Acetonic chromic acid oxidation of 5α-androst-2-ene-1α,17β-diol gives 5α-androst-2-ene-1,17-dione which, in turn, is reduced to the 2,3-dihydro derivative by hydrogenation over $RuO_2$.

Preparation of 17β-hydroxy-5α-androst-2-en-1-one proceeds, seriatim, by protection of the hydroxyl in 17β-hydroxy-5α-androst-1-en-3-one via formation of the pyranyl ether, epoxidation of the double bond with hydrogen peroxide, conversion of the epoxide to the 1α-hydroxy-2-ene derivative with hydrazine hydrate, acetonic chromic acid oxidation of the 1-hydroxyl to a keto group, and cleavage of the pyranyl ether linkage with methanolic p-toluenesulfonic acid in acetone. The double bond in 17β-hydroxy-5α-androst-2-en-1-one is, of course, subject to reduction by ruthenium dioxide-catalyzed hydrogenation.

The 1α-alkanoyloxy-5α-androst-2-en-17β-ols hereof eventuate upon esterification of 17β-pyranyloxy-5α-androst-2-en-1α-ol with pyridine and alkanoic acid anhydride at room temperatures for 12 or more hours, followed by heating with p-toluenesulfonic acid. These, in turn, afford the corresponding 17-ones via acetonic Jones reagent; and the 1-ester group is saponifiable by warming in aqueous methanolic sodium carbonate. Alternatively, ethynylation of a 1α-alkanoyl-5α-androst-2-en-17-one at temperatures of the order of —60° in alkaline ethereal solvent medium yields 17α-ethynyl-5α-androst-2-ene-1α,17β-diol, which can be selectively esterified by the same techniques which apply to the 17-alkyl diols of this invention or oxidized to the 1-one with acetonic chromic acid. Likewise, the ethynylation, selective esterification, and oxidation procedures aforesaid provide the corresponding 2,3-dihydro compounds via preliminary reduction of the double bond in the 1α-alkanoyl-5α-androst-2-en-17-one starting material.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade (° C.) and relative amounts of materials are in parts by weight, except as otherwise noted. Specific rotation is referred to the D line of sodium.

EXAMPLE 1

*17α-methyl-5α-androst-2-ene-1α,17β-diol.*—A mixture of 8 parts of 1α,2α-epoxy-17β-hydroxy-17α-methyl-5α-androstan-3-one and approximately 124 parts of 100% hydrazine hydrate is allowed to stand ½ hour at room temperatures, is then heated at 90–100° for 15 minutes, and is finally heated at 100° under reflux for 15 minutes. The resultant mixture, on cooling, separates into a solid and a supernatant oil. The oil is decanted into 5 volumes of water, and the precipitate which forms is filtered off and combined with the aforesaid solid. The combined material is taken up in approximately 16 parts of methanol, and the methanol solution is poured into approximately 200 parts of ice and water. The precipitate thrown down is filtered off; washed consecutively with 1% hydrochloric acid, aqueous 5% sodium bicarbonate, and water; and dried in air. The product thus isolated is 17α-methyl-5α-androst-2-ene-1α,17β-diol which, recrystallized from aqueous methanol, melts at 102–104°. The product has the formula

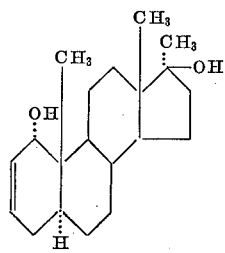

EXAMPLE 2

*1α - acetoxy-17α-methyl-5α-androst-2-en-17β-ol.*—A solution of 3 parts of 17α-methyl-5α-androst-2-ene-1α,17β-diol in a mixture of 44 parts of dry pyridine and 22 parts of acetic anhydride is allowed to stand at room temperatures overnight, then poured into 300 parts of water. The gum which forms is extracted into ether. The ether extract is consecutively washed with water, 5% hydrochloric acid, and aqueous 5% sodium bicarbonate, whereupon it is dried over anhydrous potassium carbonate in the presence of decolorizing charcoal, filtered, and stripped of solvent by vacuum distillation. The residual oil is crystallized from aqueous methanol. The product thus isolated is 1α-acetoxy-17α-methyl-5α-androst-2-en-17β-ol melting at 61.5–64°, and having the formula

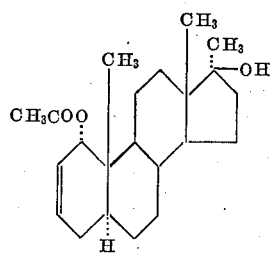

EXAMPLE 3

*1α,17β-diacetoxy-17α-methyl-5α-androst-2-ene.*—A solution of 5 parts of 17α-methyl-5α-androst-2-ene-1α,17β-diol in a mixture of 70 parts of dry pyridine and 35 parts of acetic anhydride is heated at the boiling point in an atmosphere of nitrogen under reflux for 7 hours, then cooled and poured into 3 volumes of water. The precipitate which forms is filtered off, washed with water, and dried in air. The resultant material is taken up in ether; and the ether solution is dried over anhydrous potassium carbonate in the presence of decolorizing charcoal, then filtered and stripped of solvent by distillation. The residue is recrystallized from aqueous methanol to give 1α,17β - diacetoxy - 17α-methyl-5α-androst-2-ene which, in chloroform solution, is characterized by infrared peaks at 3.4, 5.76, 6.01, and 7.95 microns. The product has the formula

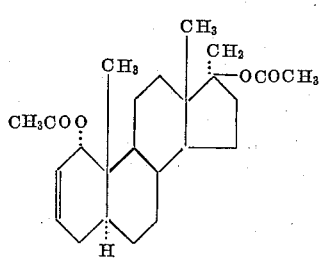

EXAMPLE 4

*17β - acetoxy-17α-methyl-5α-androst-2-en-1α-ol.*—To a solution of 20 parts of 1α,17β-diacetoxy-17α-methyl-5α-androst-2-ene in 400 parts of methanol is added a solution of 7 parts of sodium carbonate in 80 parts of water. The resultant mixture is heated at approximately 45° with agitation for 15 minutes, whereupon it is chilled to 5° and water added until precipitation occurs. The precipitate is filtered off, washed with water, dried in air, and recrystallized from aqueous ethanol to give 17β-acetoxy-17α-methyl-5α-androst-2-en-1α-ol, which is characterized, in chloroform solution, by infrared peaks at 2.75, 3.4, 5.75, 6.01, and 7.93 microns. The product has the formula

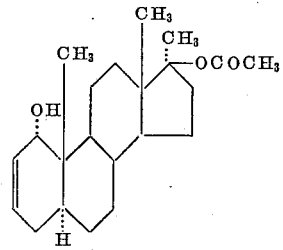

EXAMPLE 5

*17β-hydroxy-17α-methyl-5α-androst-2-en-1-one.*—To a solution of 2 parts of 17α-methyl-5α-androst-2-ene-1α,17β-diol in approximately 96 parts of acetone is added, with agitation at room temperatures, a slight excess of Jones reagent. Excess reagent is decomposed by the addition of 1 part of 2-propanol, whereupon the inorganic salts which precipitate are filtered out and the filtrate poured into 500 parts of water. The precipitate thrown down is collected on a filter, washed with water, and dried in air. The product thus isolated is 17β-hydroxy-17α-methyl-5α-androst-2-en-1-one melting at 153–155°, and having the formula

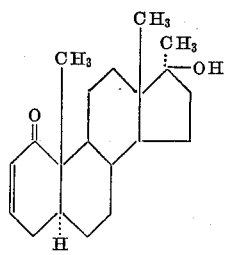

EXAMPLE 6

*17α-methyl-5α-androstane-1α,17β-diol.*—A solution of 5 parts of 17α-methyl-5α-androst-2-ene-1α,17β-diol in 160 parts of anhydrous ethanol is hydrogenated under 68 atmospheres pressure at 100° in the presence of 2 parts of ruthenium dioxide for 18 hours. The resultant mixture is poured into 5 volumes of aqueous 2% sodium carbonate; and the precipitate thrown down is filtered off, washed with water, and dried in air. It is then taken up in ether, the ether solution is filtered, and the filtrate is freed of solvent by distillation. The residue, recrystallized from a mixture of acetone and hexane, affords 17α-methyl-5α-androstane-1α,17β-diol melting at 191–193°. The product has the formula

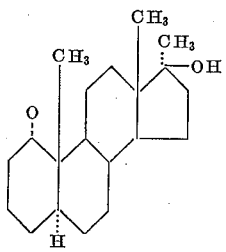

EXAMPLE 7

*1α-acetoxy-17α-methyl-5α-androstan-17β-ol.*—A solution of 1 part of 17α-methyl-5α-androstane-1α,17β-diol in a mixture of 15 parts of dry pyridine and 7 parts of acetic anhydride is allowed to stand at room temperatures for 48 hours, then poured into 75 parts of water. The resultant mixture is extracted with ether; and the ether extract is consecutively washed with 5% hydrochloric acid and aqueous 5% sodium bicarbonate, then dried over anhydrous potassium carbonate in the presence of decolorizing charcoal. It is next filtered and finally stripped of solvent by distillation. The residue is chromatographed on silica gel, using benzene and ethyl acetate as developing solvents. From an eluate comprising 10% ethyl acetate in benzene, upon evaporation of solvent, there is obtained 1α-acetoxy-17α-methyl-5α-androstan-17β-ol as the residual oil. The product is characterized, in chloroform solution, by infrared peaks at 2.75, 3.42, 5.75, and 7.94 microns. It has the formula

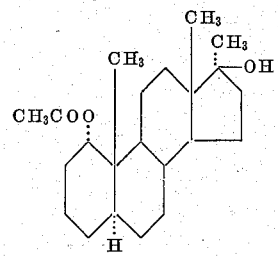

EXAMPLE 8

*17β - hydroxy-17α - methyl-5α-androstan-1-one.*—To a solution of 4 parts of 17α-methyl-5α-androstane-1α,17β-diol in 160 parts of acetone is added a slight excess of Jones reagent. The excess is destroyed by introducing 1 part of 2-propanol, whereupon the inorganic salts thrown down are filtered off and the filtrate poured into approximately 5 volumes of water. The precipitate which forms is collected, washed with water, and recrystallized from aqueous methanol to afford 17β-hydroxy-17α-methyl-5α-androstan-1-one melting at 173.5–175°. The product has the formula

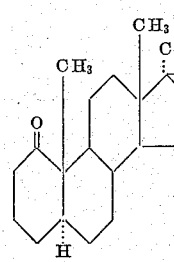

EXAMPLE 9

*17β-acetoxy-17α-methyl-5α-androstan-1-one.*—Substitution of 5 parts of 17β-hydroxy-17α-methyl-5α-androstan-1-one for the 17α-methyl-5α-androst-2-ene-1α,17β-diol called for in Example 3 affords, by the procedure there detailed, 17β-acetoxy-17α-methyl-5α-androstan-1-one, the formula of which is

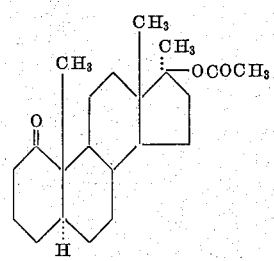

EXAMPLE 10

*5α-androst-2-ene-1α,17β-diol.*—A mixture of 2 parts of 17β-acetoxy-1α,2α-epoxy-5α-androstan-3-one and approximately 31 parts of hydrazine hydrate is heated at 90° for 25 minutes, then at approximately 120° under reflux for 15 minutes. The resultant mixture is cooled to around 5°, whereupon the supernatant layer is decanted into water. The aqueous mixture is extracted with ether, and the ether extract is dried over anhydrous potassium carbonate in the presence of decolorizing charcoal. Filtration, followed by distillation of solvent, leaves an oil which is partitioned between methanol and ether. The ether phase is separated, washed with water, dried over anhydrous potassium carbonate, and stripped of solvent by distillation. The residual foam, recrystallized from a mixture of acetone and hexane, affords 5α-androst-2-ene-1α,17β-diol melting at 140–143°. The product has the formula

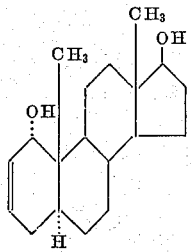

EXAMPLE 11

*17β-acetoxy-5α-androst-2-en-1α-ol.*—A solution of 2 parts of 5α-androst-2-ene-1α,17β-diol in a mixture of 30 parts of pyridine and 15 parts of acetic anhydride is maintained under nitrogen with agitation at room temperatures for 2 hours. It is thereupon poured into 300 parts of water, and the resultant mixture is extracted with ether. The ether extract is consecutively washed with 5% hydrochloric acid, aqueous 5% sodium bicarbonate, and water, then dried over anhydrous potassium carbonate in the presence of decolorizing charcoal. Filtration and removal of solvent by distillation leaves an oil which, after further purification by chromatography on silica gel, using benzene and ethyl acetate as developing solvents, affords 17β-acetoxy-5α-androst-2-en-1α-ol. The product is characterized by infrared maxima at 2.75, 3.4, 5.77, 6.02, and 7.95 microns. It has the formula

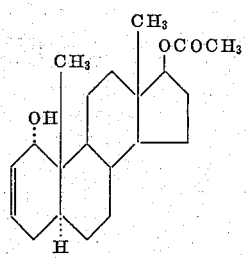

EXAMPLE 12

*1α,17β-diacetoxy-5α-androst-2-ene.*—Substitution of 5 parts of 17β-acetoxy-5α-androst-2-en-1α-ol for the 17α-methyl-5α-androst-2-ene-1α,17β-diol called for in Example 3 affords, by the procedure there detailed, 1α,17β-diacetoxy-5α-androst-2-ene, the formula of which is

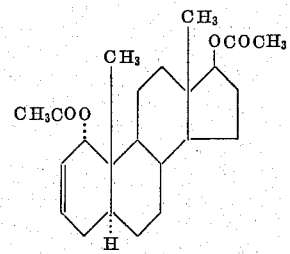

EXAMPLE 13

*5α-androst-2-ene-1,17-dione.*—A solution of 4 parts of 5α-androst-2-ene-1α,17β-diol and 64 parts of acetone is mixed with a slight excess of Jones reagent. The excess is thereupon destroyed by the addition of 1 part of 2-propanol. Separation from the inorganic salts thrown down is effected by decanting the supernatant into 5 volumes of a mixture of ice and water. The resultant mixture is extracted with ether; and the ether extract is washed with water, dried over anhydrous potassium carbonate in the presence of decolorizing charcoal, and filtered. The filtrate is stripped of solvent by distillation, leaving an oil which is chromatographed on silica gel, using benzene and ethyl acetate as developing solvents. From an eluate comprising 5% ethyl acetate in benzene, upon evaporation of solvents, there is obtained a residue which, recrystallized from a mixture of acetone and hexane, affords 5α-androst-2-ene-1,17-dione melting at 151–154°. The product has the formula

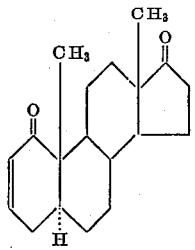

EXAMPLE 14

(A) *17β-pyranyloxy-5α-androst-1-en-3-one.*—A mixture of 1000 parts of 17β-hydroxy-5α-androst-1-en-3-one, 1200 parts of dihydropyran, 10,000 parts of dichloromethane, and 1 part of p-toluenesulfonic acid monohydrate is allowed to stand at room temperatures overnight, whereupon it is washed thoroughly with water, dried over anhydrous potassium carbonate in the presence of decolorizing charcoal, filtered, and stripped of solvent by distillation. The residual dark oil is 17β-pyranyloxy-5α-androst-1-en-3-one.

(B) *1α,2α-epoxy-17β-pyranyloxy-5α-androstan-3-one.*— To a solution of 20 parts of 17β-pyranyloxy-5α-androst-1-en-3-one in approximately 272 parts of methanol at 5° is added a solution of 25 parts of 30% hydrogen peroxide in approximately 6 parts of methanolic 10% sodium hydroxide. The resultant mixture is allowed to stand for 20 minutes and then poured into 5 volumes of a mixture of ice and water. This mixture is extracted with dichloromethane and then with an 11-to-2 mixture of chloroform and methanol. The extracts are combined, washed with water, dried over anhydrous potassium carbonate in the presence of decolorizing charcoal, filtered, and stripped of solvent by distillation. The yellow oily residue solidifies on standing. Recrystallized from aqueous methanol, it melts at 123–125°. This material is 1α,2α-epoxy-17β-pyranyloxy-5α-androstan-3-one.

(C) *17β-pyranyloxy-5α-androst-2-en-1α-ol.*—A mixture of 4 parts of 1α,2α-epoxy-17β-pyranyloxy-5α-androstan-3-one and approximately 62 parts of 85% hydrazine hydrate is heated at 90–100° for 5 minutes, then at 120° under reflux for 20 minutes. The resultant mixture is chilled, and the supernatant liquid is decanted and discarded. The semi-solid residue is taken up in 40 parts of methanol, and the methanol solution is poured into 300 parts of cold water. The precipitate which forms is filtered off, washed with water, and dried in air. This material is 17β-pyranyloxy-5α-androst-2-en-1α-ol.

(D) *17β-pyranyloxy-5α-androst-2-en-1-one.*—A solution of 3 parts of 17β-pyranyloxy-5α-androst-2-en-1α-ol in approximately 36 parts of acetone is mixed with a slight excess of Jones reagent. The excess reagent is thereupon destroyed with 2-propanol, following which the inorganic salts thrown down are filtered out and the filtrate poured into 350 parts of cold aqueous 1% sodium bicarbonate. The resultant mixture is extracted with ether; and the ether extract is washed with water, dried over anhydrous potassium carbonate in the presence of decolorizing charcoal, filtered, and stripped of solvent by distillation. The residual oil is 17β-pyranyloxy-5α-androst-2-en-1-one.

(E) *17β-hydroxy-5α-androst-2-en-1-one.*—To a solution of 13 parts of 17β-pyranyloxy-5α-androst-2-en-1-one in 200 parts of acetone is added a solution of 5 parts of p-toluenesulfonic acid monohydrate in 80 parts of methanol. The resultant mixture is heated at the boiling point under reflux for 15 minutes and thereupon allowed to stand at room temperatures for 48 hours. It is then poured into 5 volumes of water. The precipitate which forms is filtered off, washed with water, dried in air, and chromatographed on silica gel, using benzene and ethyl acetate as developing solvents. From an eluate comprising 5% ethyl acetate in benzene, on evaporation of solvent and recrystallization of the residue from a mixture of acetone and hexane, 17β-hydroxy-5α-androst-2-en-1-one melting at 179–181° is obtained. The product has the formula

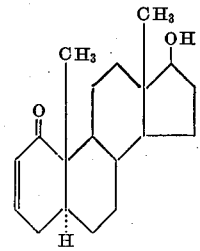

EXAMPLE 15

*17β-acetoxy-5α-androst-2-en-1-one.*—Substitution of 2 parts of 17β-hydroxy-5α-androst-2-en-1-one for the 5α-androst-2-ene-1α,17β-diol called for in Example 11 affords, by the procedure there detailed, 17β-acetoxy-5α-androst-2-en-1-one, of the formula

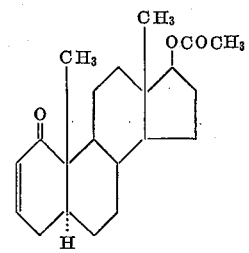

EXAMPLE 16

(A) *1α-acetoxy-17β-pyranyloxy-5α-androst-2-ene.* — A solution of 12 parts of 17β-pyranyloxy-5α-androst-2-en-1α-ol in a mixture of 200 parts of pyridine and 100 parts of acetic anhydride is allowed to stand at room temperatures for 48 hours. It is then poured into 3 volumes of cold water, whereupon the oily precipitate which forms is extracted into ether. The ether solution is consecutively washed with water, 5% hydrochloric acid, and aqueous 5% sodium bicarbonate, then dried over anhydrous potassium carbonate in the presence of decolorizing charcoal, filtered, and stripped of solvent by distillation. The residual oil is 1α-acetoxy-17β-pyranyloxy-5α-androst-2-ene.

(B) *1α-acetoxy-5α-androst-2-en-17β-ol.*—A solution of 12 parts of 1α-acetoxy-17β-pyranyloxy-5α-androst-2-ene and 7 parts of p-toluenesulfonic acid monohydrate in approximately 400 parts of methanol is allowed to stand at 30° for 1¼ hours. It is then poured into 3 volumes of water. The resultant mixture is extracted with ether. The ether extract is washed with water, dried over anhydrous potassium carbonate in the presence of decolorizing charcoal, and stripped of solvent by distillation. The residual dark yellow oil is the desired 1α-acetoxy-5α-androst-2-en-17β-ol, of the formula

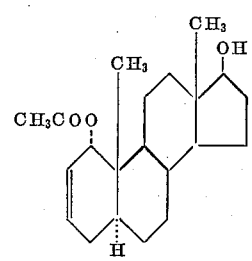

EXAMPLE 17

*1α-acetoxy-5α-androst-2-en-17-one.*—To a solution of 8 parts of 1α-acetoxy-5α-androst-2-en-17β-ol in 120 parts of acetone is added a slight excess of Jones reagent. The excess reagent is decomposed with 2-propanol, and the inorganic salts thrown down are thereupon removed by filtration. The filtrate is poured into 5 volumes of water. The mixture thus obtained is extracted with ether. The ether extract is washed with water, dried over anhydrous potassium carbonate in the presence of decolorizing charcoal, filtered, and stripped of solvent by distillation. The residual yellow oil is chromatographed on silica gel, using benzene and ethyl acetate as developing solvents. From an eluate comprising 5% ethyl acetate in benzene, on distillation of solvent and recrystallization of the residue from acetone, there is obtained 1α-acetoxy-5α-androst-2-en-17-one melting at 170–173°, and further characterized by a specific rotation of +301.5° in chloroform solution at 28°. The product has the formula

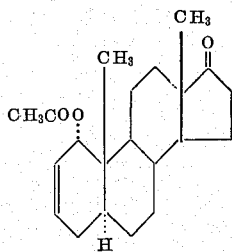

EXAMPLE 18

*1α-hydroxy-5α-androst-2-en-17-one.* — Substitution of 20 parts of 1α-acetoxy-5α-androst-2-en-17-one for the 1α,17β-diacetoxy-17α-methyl-5α-androst-2-ene called for in Example 4 affords, by the procedures there detailed, 1α-hydroxy-5α-androst-2-en-17-one, having the formula

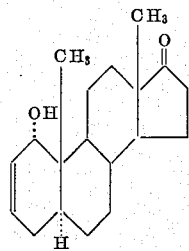

EXAMPLE 19

*17α-ethynyl-5α-androst-2-ene-1α,17β-diol.*—To 95 parts of diethyleneglycol dimethyl ether and 6 parts of diethyleneglycol monomethyl ether at 135° under nitrogen with vigorous agitation is added, portionwise, 25 parts of potassium hydroxide. Thereafter, temperature is maintained at 135° with vigorous agitation for ½ hour, whereupon the reactants are slowly cooled to room temperature and then to approximately −60°, at which temperature acetylene is continuously introduced during 2 hours and while a solution of 5 parts of 1α-acetoxy-5α-androst-2-en-17-one in approximately 14 parts of diethyleneglycol dimethyl ether is mixed in over a 20-minute period. Introduction of acetylene is continued for an hour longer, whereupon 60 parts of water is thoroughly mixed in. The resultant mixture is poured into 3 volumes of a mixture of ice and water incorporating approximately 48 parts of concentrated hydrochloric acid. The precipitate which forms is filtered off and taken up in ether. The ether solution is washed with water, dried over anhydrous sodium sulfate in the presence of decolorizing charcoal, filtered, and stripped of solvent by distillation. The residual solid, recrystallized from aqueous methanol, affords 17α-ethynyl - 5α - androst-2-ene-1α,17β-diol, which is characterized by peaks in the infrared spectrum of a chloroform solution at 2.75, 3.01, 3.4, and 6.01 microns. The product has the formula

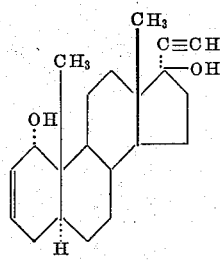

What is claimed is:

1. A compound selected from the group consisting of compounds of the formula

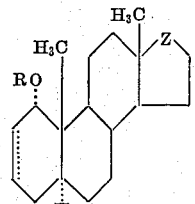

and compounds of the formula

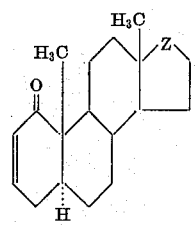

wherein R is selected from the group consisting of hydrogen and lower alkanoyl radicals; Z is selected from the group consisting of the carbonyl radical and radicals of the formula

in which R' is selected from the group consisting of hydrogen and ethynyl, methyl, and ethyl radicals and R'' is hydrogen; and the dotted line represents an optional double bond.

2. A compound of the formula

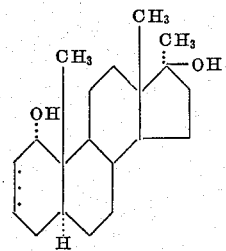

wherein the dotted line in ring A represents an optional double bond.

3. 17α-methyl-5α-androst-2-ene-1α,17β-diol.

4. A compound of the formula

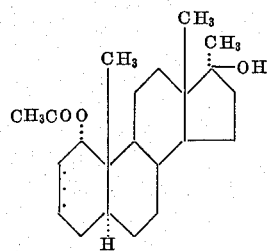

wherein the dotted line in ring A represents an optional double bond.

5. 1α-acetoxy-17α-methyl-5α-androst-2-en-17β-ol.
6. A compound of the formula
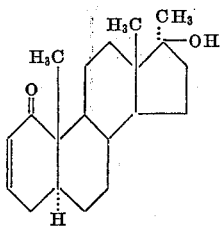
7. 17β-acetoxy-5α-androst-2-en-1-one.
8. 17α-ethynyl-5α-androst-2-ene-1α,17β-diol.
9. 17α-methyl-5α-androstane-1α,17β-diol.
References Cited by the Examiner
UNITED STATES PATENTS
2,805,231  9/1957  Dodson et al. _____ 260—397.4
3,002,007  9/1961  Hoehm _____ 260—397.3
LEWIS GOTTS, *Primary Examiner.*
HENRY A. FRENCH, *Assistant Examiner.*